United States Patent [19]

Richardson et al.

[11] Patent Number: 5,291,409
[45] Date of Patent: Mar. 1, 1994

[54] SPARK TIMING CONTROL SYSTEM

[75] Inventors: Daniel J. Richardson, Grand Blanc, Mich.; Charles M. Grimm, Luxembourg, Luxembourg

[73] Assignees: General Motors Corp., Detroit, Mich.; Delco Electronics Corp., Kokomo, Ind.

[21] Appl. No.: 675,564

[22] Filed: Mar. 27, 1991

[51] Int. Cl.$^5$ .............................. F02P 5/15
[52] U.S. Cl. .................... 364/431.07; 123/414; 123/417; 123/419
[58] Field of Search ............... 364/431.01, 431.03, 364/431.04, 431.05, 431.07, 431.08; 123/414, 416–419, 422, 423, 426

[56] References Cited

U.S. PATENT DOCUMENTS

| | | | |
|---|---|---|---|
| 4,231,091 | 10/1980 | Motz | 123/414 X |
| 4,649,881 | 3/1987 | Long | 123/418 |
| 4,723,520 | 2/1988 | Suzuki et al. | 123/414 X |
| 4,747,383 | 5/1988 | Kimura et al. | 123/418 X |
| 4,893,244 | 1/1990 | Tang et al. | 364/431.03 |
| 5,019,988 | 5/1991 | Glehr | 364/431.03 |
| 5,086,741 | 2/1992 | Nakamura et al. | 123/419 |

*Primary Examiner*—Vincent N. Trans
*Attorney, Agent, or Firm*—Creighton R. Meland

[57] ABSTRACT

A digital spark timing control for an ignition system of a spark ignited internal combustion engine. Engine crankshaft position sensor, develops by way of example, three reference pulses and eighteen position pulses for each complete revolution of the crankshaft. The reference pulses are angularly spaced by 120° and the position pulses by 20°. A spark taming value is computed by a computer and its program is interrupted at the occurrence of a reference or position pulse. The system at the occurrence of each interrupt determines whether or not the spark is to occur in the next twenty degree period. If the spark should occcur in the next twenty degree period, the system utilizes the most recent twenty degree time period to determine how long it will take the engine crankshaft to rotate from its current position to the desired spark position. This compensates for spark timing errors that might otherwise occur due to changes in engine speed.

5 Claims, 3 Drawing Sheets

SPARK TIMING CONTROL SYSTEM

This invention relates to a spark timing control system for an ignition system of a spark ignited internal combustion engine.

Digital spark timing control systems for spark ignited internal combustion engines are well known, one example being the system disclosed in the U.S. Pat. No. 4,231,091 to Motz. In known digital spark timing systems, a plurality of consecutively occurring reference position pulses are provided in synchronism with rotation of an engine crankshaft. These pulses control an ECM which takes the form of a programmed microprocessor. Engine RPM is determined by counting the number of constant frequency clock pulses that occur between consecutively occurring position reference pulses and the number of clock pulses so counted represent a reference time period. The ECM in response to the reference time periods and other engine operating parameters computes a spark timing value in terms of a time period. The type of system that has been described can be called a time-based system since spark timing control is achieved by computing and utilizing time periods.

The known time-based spark timing systems are subject to timing errors due to, among other things, the fact that the spark command is not based on the most recent engine speed information. If engine speed remains constant after RPM has been determined, the spark should be delivered at the desired computed crankshaft position. However, should the engine slow down (deceleration), the engine crankshaft will traverse a smaller angle in a given computed time period. Conversely, if the engine accelerates, the engine crankshaft will traverse a larger angle in a given computed time period. In either case, the change in engine speed will introduce errors in regard to the crankshaft position at which the spark plug is fired.

It, accordingly, is an object of this invention to provide a digital spark timing control which determines engine RPM over an angle of engine crankshaft rotation that immediately precedes the crankshaft position at which the spark should occur. In carrying this object forward, a crankshaft position sensor arrangement is provided which produces a plurality of reference pulses and a plurality of position pulses. The arrangement is such that a plurality of position pulses are provided between consecutively occurring reference pulses. By way of example, for a six-cylinder engine there are three reference pulses (3X) and eighteen position pulses (18X) produced for each complete revolution of the crankshaft. The 3X pulses that occur are spaced by 120° and the 18X pulses by twenty degrees.

The system of this invention uses an ECM which takes the form of a programmed microprocessor to develop various engine control functions including spark timing. The background software of the ECM makes calculations once for a certain loop time period, which may be about 12.5 milliseconds. This operation is asynchronous to crankshaft position.

The system develops interrupts at the occurrence of both the 3X and 18X pulses which stop the execution of background software cycle or loop. Further, at each interrupt, the system of this invention determines whether or not the prior computed spark is to occur during a following angular period. More specifically, in a system that develops eighteen position pulses (18X), the system determines whether or not the spark should occur within the next twenty degrees, that is, within the twenty degrees following an interrupt. If the spark is not supposed to occur within the next twenty degrees, the current supply to the primary winding of an ignition coil is not shut-off and no spark occurs. This mode of operation repeats for each consecutively occurring interrupt and eventually an interrupt crankshaft position is reached at which the spark should occur within the next twenty degrees of crankshaft rotation. When this happens, the system uses the most recent twenty degree period of time to determine how long it will take the engine to rotate from its current position (an interrupt position) to the desired spark position.

IN THE DRAWINGS

Figure 1:
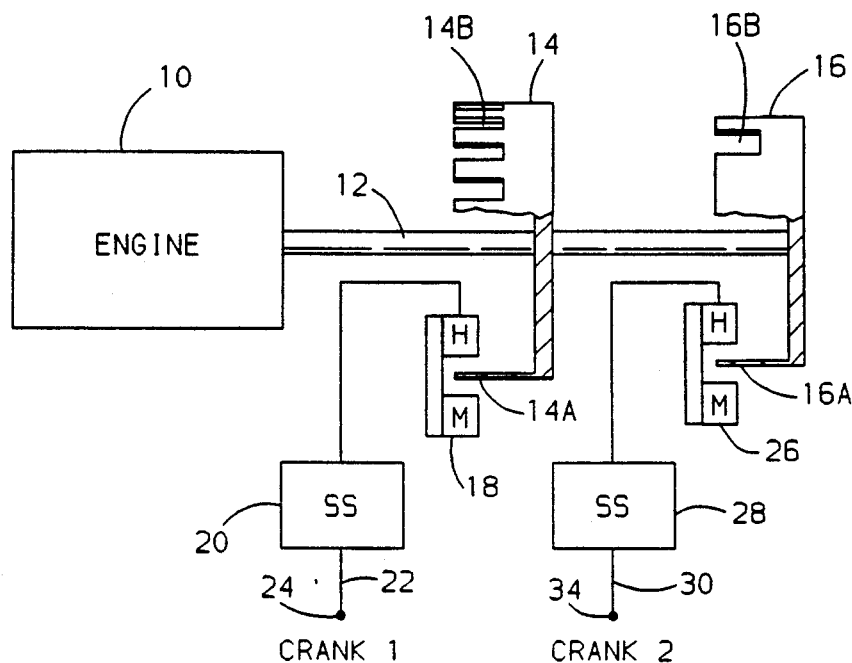
FIG. 1 illustrates engine crankshaft position detecting apparatus for developing two pulse trains related to engine crankshaft position.

Referring now to the drawings, and more particularly to FIG. 1, the reference numeral 10 designates a spark ignited internal combustion engine which, for purposes of explanation of this invention, is a six-cylinder engine. The engine 10 has a crankshaft 12 which drives two wheels 14 and 16 that are formed of magnetic material such as steel.

The wheel 14 has an annular rim 14A which rotates through a gap in a fixed Hall effect sensor 18. This sensor has a Hall effect device H and a permanent magnet M that are aligned with each other. The rim 14A has eighteen slots and eighteen teeth. The slots are designated as 14B and some of the eighteen slots are shown in FIG. 1. Each slot and tooth is about ten angular degrees wide. As the crankshaft 12 rotates, the rim 14A rotates between the Hall effect device and magnet to alternately allow flux developed by the magnet intercept the Hall effect device or be shunted away from the Hall effect device.

Figure 3:
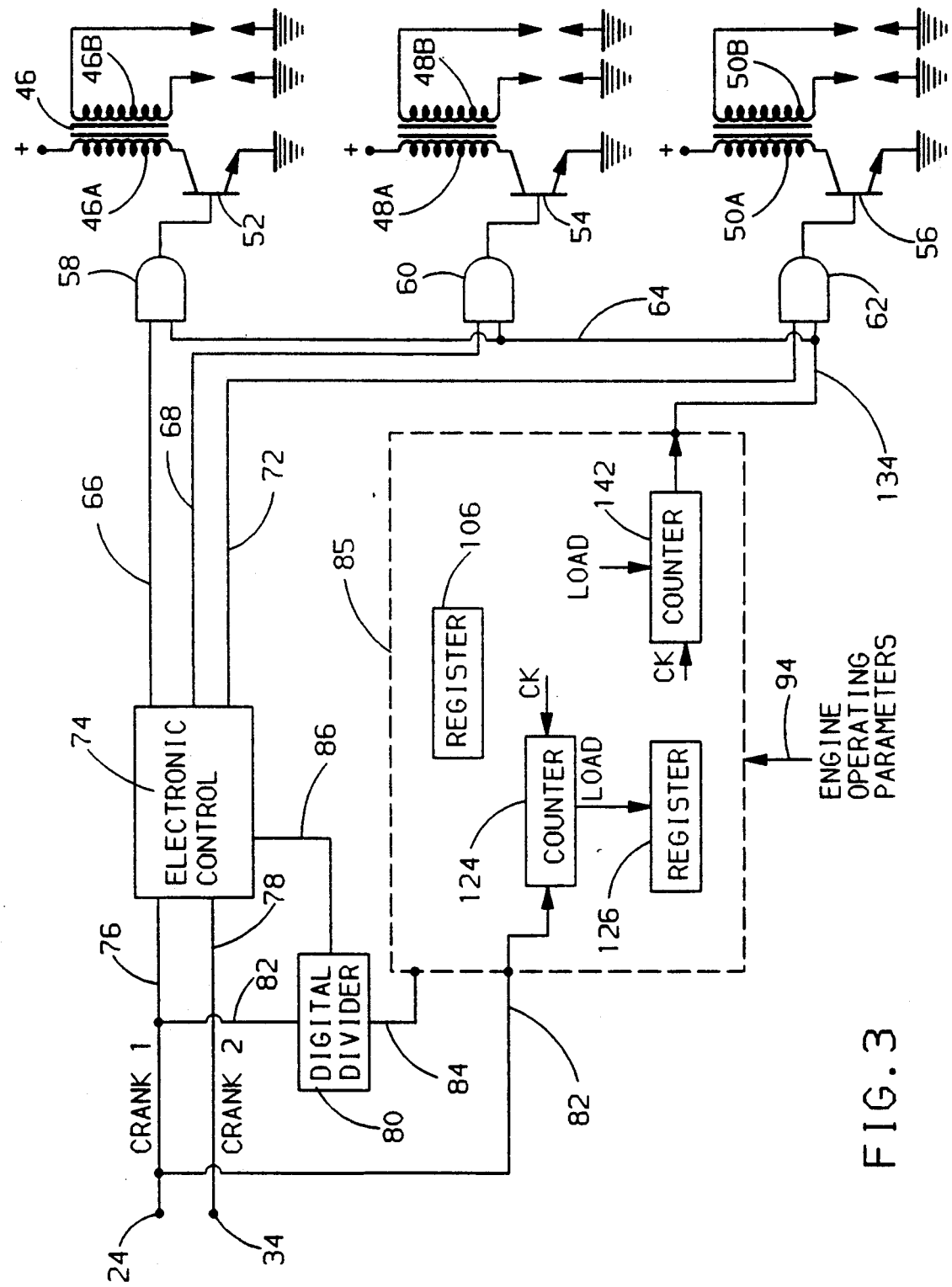
FIG. 3 illustrates an ignition system made in accordance with this invention.

The Hall effect device H of sensor 18 is connected to signal shaping circuit 20 which, in turn, is connected to an output conductor 22. Conductor 22 is connected to a junction 24. Junction 24 is also illustrated in FIG. 3.

Figure 2:
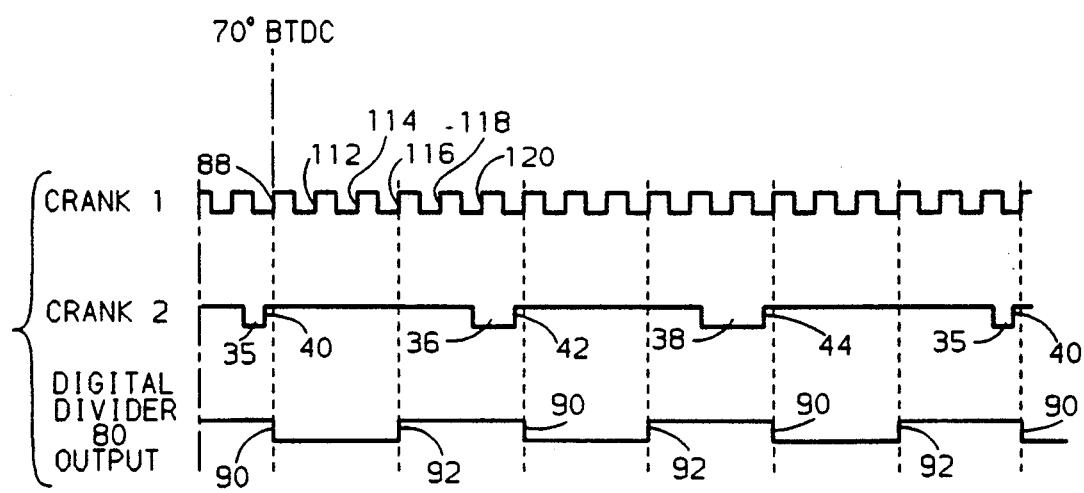
FIG. 2 illustrates various pulse trains as a function of engine crankshaft position that are used in the system of this invention.

The pulse waveform that is developed on line 22 as crankshaft 12 rotates is shown in FIG. 2, where it is identified as CRANK 1. This waveform goes alternately high and low for rotation angles of the crankshaft of ten degrees. Thus, during one revolution of crankshaft 12, there will be eighteen alternately occurring high and low periods which are each ten degrees wide.

The other wheel 16 is associated with another Hall effect sensor 26 having a Hall effect device H and a permanent magnet M. The annular rim 16A of wheel 16 rotates through the gap between the Hall effect device H and magnet M. Rim 16 has three angularly spaced slots 16B only one of which is illustrated in FIG. 1. The remainder of the rim is solid. The three slots are respectfully ten, twenty and thirty degrees wide.

The Hall effect device H of sensor 26 is connected to signal shaping circuit 28 which has an output connected to line 30. Line 30 is connected to junction 34 which is also illustrated in FIG. 3.

The pulse train due to rotation of wheel 16 that is developed as crankshaft 12 rotates is shown in FIG. 2 and identified as CRANK 2. This pulse train has three angularly spaced low periods 35, 36 and 38. Period 35 is ten angular degrees wide and periods 36 and 38 are respectively twenty and thirty degrees wide. These low periods occur when a corresponding slot in rim 16A is between the Hall effect sensor and the magnet. The edge transitions 40, 42 and 44 occur respectively at 75 degrees before top dead center of a given cylinder pair. It can be seen that the transitions of CRANK 2 always occurs five degrees after (or one half way between) the transitions of CRANK 1.

Referring now to FIG. 3, a distributorless ignition system is illustrated for the six-cylinder spark ignited internal combustion engine 10. The system has three ignition coils 46, 48 and 50 each having a primary winding 46A, 48A and 50A and secondary windings 46B, 48B and 50B. The secondary windings are respectively connected to a pair of spark plugs as illustrated.

One side of the primary windings are connected to one side of the direct voltage source on the vehicle. The primary windings are respectively connected in series with transistors 52, 54 and 56 which switch on and off. When a transistor is biased on, current is supplied to a primary winding and when the transistor is biased off, primary winding current is cut-off and a voltage is induced in a secondary winding to cause a pair of spark plugs to fire.

The bases of transistors 52-56 are shown connected respectively to AND gates 58, 60 and 62 which serve to respectively bias transistors 52-56 on or off.

One of the inputs to each AND gate is connected to a conductor 64, which receives start of dwell (SOD) and end of dwell (EOD) transition signals. An SOD transition signal will cause a transistor to be biased on or conductive and it will remain biased conductive until an EOD signal transition occurs which will cause a conducting transistor to be biased off to, in turn, cause a pair of spark plugs to be fired.

The other input to AND gates 58-62 are connected respectively to lines 66, 68 and 72 which, in turn, are connected to an electronic control 74. The control 74 contains digital logic circuitry for sequentially developing signals on lines 66, 68 and 72 to sequentially enable AND gates 58-62. Thus, only one AND gate is enabled at a time to sequentially allow an ignition coil to be energized and deenergized by SOD and EOD signal transitions.

The electronic control 74 has the CRANK 1 signal applied thereto by line 76 and has the CRANK 2 signal applied thereto by line 78. From the CRANK 1 and CRANK 2 signals, the control 74 can selectively decode and apply signals to lines 66-72 as a function of certain engine crankshaft positions. This is accomplished by counting the edge transitions of CRANK 1 that occur during a low period (35, 36 or 38) of CRANK 2.

Thus, at start-up one of the three ignition coils will be enabled dependent upon which low period (35, 36 or 38) occurs first. The manner in which the ignition coils are enabled can take other known forms and this invention does not depend on any particular arrangement for selectively and sequentially enabling the ignition coils.

The system of FIG. 3 has a digital divider 80 which has the CRANK 1 signal applied thereto by line 82. The output of the digital divider 80 on line 84 is applied to an electronic control module (ECM) 85 which is described in more detail hereinafter. When the digital divider 80 is activated, it divides the 18X signal of CRANK 1 on line 76 to produce the signal shown in FIG. 2 that is entitled "DIGITAL DIVIDER 80 OUTPUT". This signal is comprised of alternate low and high periods that extend for 60 degrees of angular rotation of the crankshaft. The divider 80 starts counting CRANK 1 pulses as soon as control 74 detects a certain angular crankshaft position. When this happens, a signal is developed on-line 86 to cause divider 80 to start counting. Assuming that the low period 35 was the one to first occur, the divider 80 starts counting at the transition 88 of CRANK 1. This transition occurs at 70 degrees before top dead center (BTDC) of a cylinder pair and at this point, the divider signal output goes low (transition 90). Divider 80 now counts six 10 degree periods of CRANK 1 so that after a crankshaft rotation of 60 degrees the digital divider output goes high (transition 92). This sequence repeats as is evident from an inspection of FIG. 2.

Transitions 90 occur at 70 degrees BTDC of respective cylinder pairs. Transitions 92 occur at 10 degrees BTDC of respective cylinder pairs.

The transitions 90 provide crankshaft position reference pulses that are applied to the ECM 85 via line 84. In terms of crankshaft angular rotation, the transitions 90 are 120 degrees apart. The ECM also uses the transitions 90 to compute engine RPM. Thus, in a known manner, constant frequency clock pulses are counted for 120 degree periods between transitions 90 to determine engine RPM. Transitions 90 provide a 3X signal since three of them occur for each 360 degrees of rotation of the crankshaft.

The ECM 85 is a programmed microprocessor which may be of the type disclosed in the U.S. Pat. No. 4,231,091 to Motz. ECM 85 determines engine speed from the 3X pulse transitions 90. Other engine operating parameters are applied to ECM 85 via line 94 which may include engine temperature, manifold pressure, mass airflow, etc.

Figure 4:
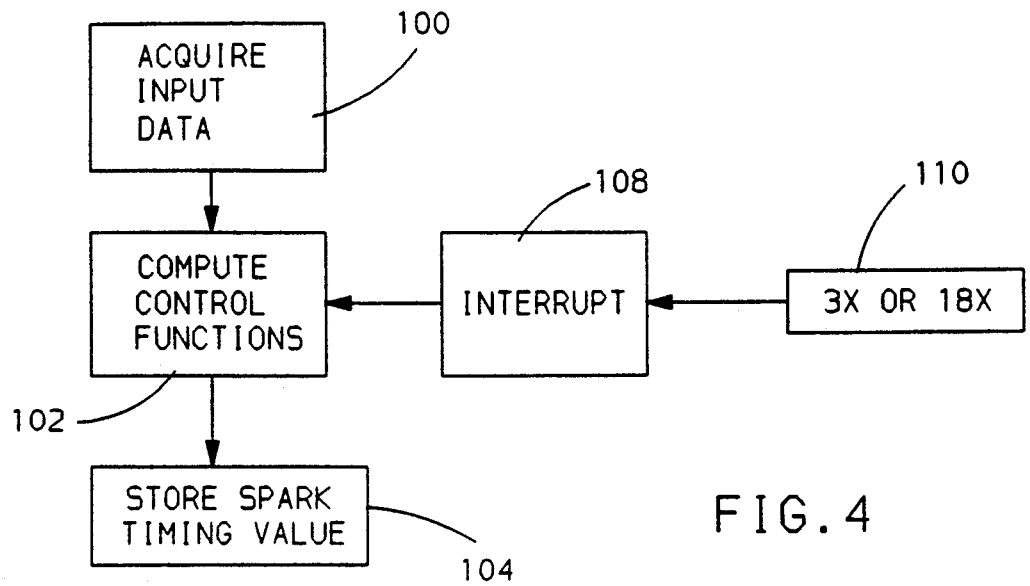
FIGS. 4 and 5 show flow charts illustrating the manner in which the system of this invention is controlled.

Referring now to FIG. 4, a generalized flow chart is illustrated that is carried out by the program of ECM 85. In step 100, various input data (engine operating parameters) is acquired. In block 102, the ECM computes a plurality of engine control functions including the computation of a spark timing advance or retard value which is then stored in step 104. The spark timing value is computed as a function of engine RPM (time period between transitions 90) and other engine operating parameters applied thereto by line 94. The spark timing value can be stored in a register identified as 106 in FIG. 3. Step 102 is actually comprised of a number of programmed computation steps that compute spark timing and various other engine control functions. The background software of ECM 85 causes the FIG. 4 steps to be completed in, for example, about 12.5 milliseconds. This operation is asynchronous to engine crankshaft position. As a result of what has been stated and assuming no interrupt of the background software, a spark timing value is computed every 12.5 milliseconds.

In FIG. 4, a block entitled "INTERRUPT" and identified as 108 is shown. Block 108 is shown being actuated by block 110. The ECM 85 recognizes the occurrence of the 3X transitions 92 and the 18X transitions, some of which are identified as 112, 114, 116, 118 and 120 in FIG. 2. These transitions occur respectively at 50° BTDC, 30° BTDC, 10° BTDC and 10° after top dead center (ATDC) and 30° ATDC.

The background software (12.5 millisecond software) is interrupted each time a 3X or an 18X transition occurs. This is depicted by blocks 108 and 110 in FIG. 4. Thus, when an interrupt occurs, the computation steps that are performed by ECM 85 by the background 12.5 millisecond software is stopped for a certain interrupt time period allowing the ECM to perform other processing and computation steps shown in FIG. 5 during the interrupt time period.

In FIG. 3, ECM 85 is shown as having a clock pulse counter 124 that is connected to a source of constant frequency clock pulse CK. Counter 124 is also connected to the CRANK 1 (18 X) pulses via line 82. The counter counts clock pulses between 18X transitions and loads that count into a storage register 126. Thus, counter 124 counts clock pulses for each twenty degrees of angular rotation of the crankshaft. Accordingly, storage register 126 contains a pulse count that corresponds to the most recent twenty degrees of angular rotation of the crankshaft. This pulse count represents a time period and corresponds to a period of time for the crankshaft to rotate through twenty angular degrees.

Figure 5:
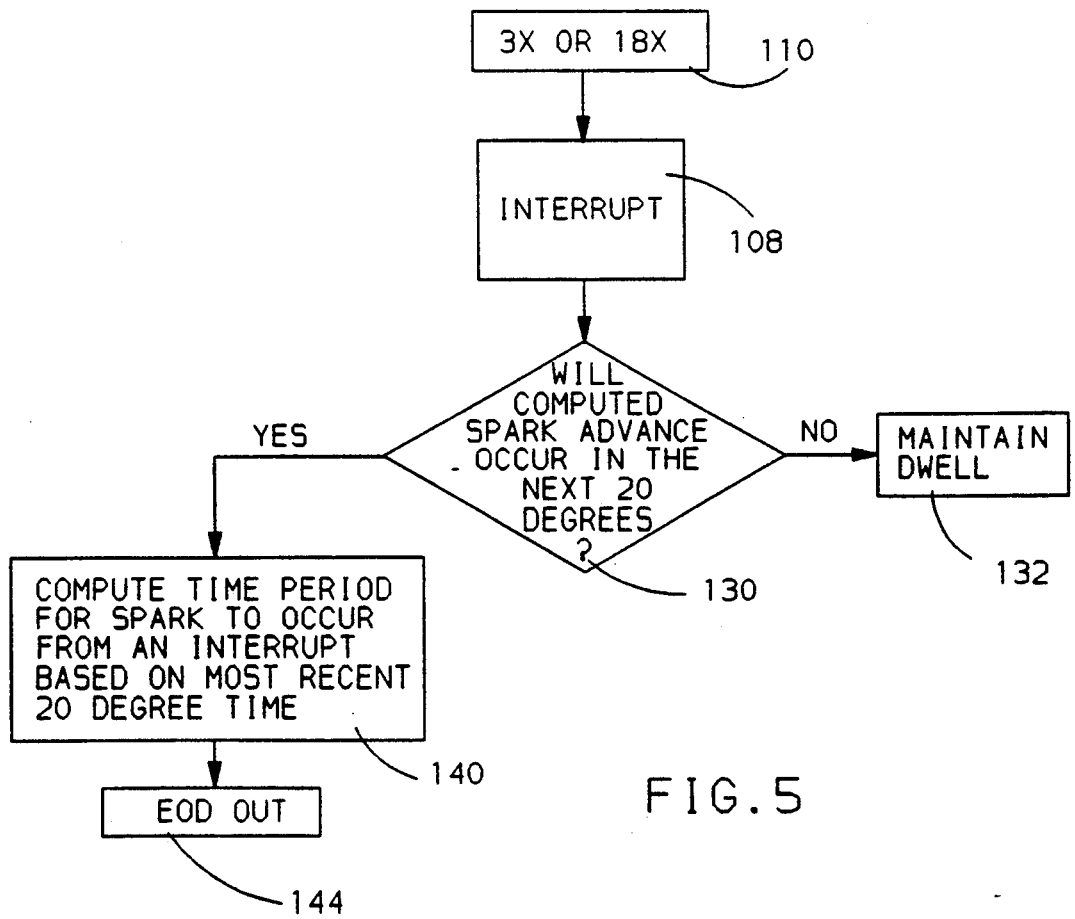

The operation of the system will now be further described in connection with the flow diagram of FIG. 5 and on the assumption that the computed spark is to occur (EOD) at 25 degrees BTDC or, in other words, five degrees after transition 114 (FIG. 2). The ECM 85 will have computed this spark advance value and it is available in register 106. When a 3X interrupt occurs at 70° BTDC, the ECM 85 will go through the programmed steps shown in FIG. 5 during the interrupt period. When an interrupt occurs (blocks 108 and 110), the step 130 is executed. In step 130, it is determined whether or not the computed spark advance point (EOD) will occur in the next twenty degrees of rotation of the crankshaft. Since computed spark advance is 25° BTDC, it will not occur in the next twenty degrees, that is, it will not occur between 70° BTDC and 50° BTDC. The answer to step 130 is NO. This causes block 132 to maintain dwell, that is, to maintain one of the transistors 52-56 biased conductive. In this regard, it is assumed that ECM 85 has previously issued an SOD signal on line 134 and this signal is maintained at a level which maintains an enabled transistor biased on.

In regard to step 130, if the computed spark advance angle ACOMP represents an angle from a reference position pulse to the crankshaft position at which the spark should occur, the determination of whether or not the spark is to occur in the next twenty degrees can be determined by the relationship ACOMP-XAP<20° where X is the number of twenty degree periods equal to AP that have occurred since the occurrence of a reference pulse transition 90. Based on this, for the example given, ACOMP=45°, AP=20° and X=0 and accordingly, 45°−0° is greater than 20°. The answer in step 130 is therefore NO.

When transition 112 occurs (50° BTDC) another interrupt occurs and step 130 is again executed. The answer in block 130 is again NO since 45°−(1)(20°) is equal to 25° which is greater than 20° and accordingly dwell is maintained (block 132).

The next interrupt occurs at transition 114 (30° BTDC). Now the spark (EOD) should occur in the next twenty degrees of crankshaft rotation since 45°−(2)(20°) is equal to 5° which is less than 20°. The answer in step 130 is therefore YES, that is, the spark (EOD) should occur in the twenty degree period following transition 114.

Since the answer in step 130 is YES, the program proceeds to step 140. In step 140, a time period is computed at which the spark is to occur (EOD) subsequent to the occurrence of transition 114 and based on the most recent twenty degree time. The computed time period accordingly is from transition 114 to some point where EOD will occur. The most recent twenty degree time period is available in register 126 and it corresponds to the time period that elapsed between transitions 112 and 114 or, in other words, the time period between 50° BTDC and 30° BTDC. This time period also represents engine RPM.

When an interrupt occurred at transition 114, the computed remaining spark firing angle, for the example given, from transition 114 to where the computed spark should occur is five degrees. This five degree angle value is converted into a time period in step 140 by an angle-to-time period conversion that utilizes the most recent twenty degree time period (50 BTDC to 30 BTDC) in the conversion. This conversion develops a digital signal that represents a certain number of clock pulses and this signal is loaded into a counter 142 of the ECM 85 (FIG. 3). When the interrupt corresponding to transition 114 occurs the counter 142, after being loaded, is counted down by constant frequency clock pulses CK and when counted down to zero, the counter 142 develops an EOD pulse or transition that is applied to line 134 which terminates the dwell and biases one of the transistors off or nonconductive to cause a spark to be developed. The loading and counting down of counter 142 is shown as step 144 entitled "EOD OUT" in FIG. 5.

In regard to the computation of the spark firing time period subsequent to transition 114, it can be appreciated that in the type of system that has been described, the amount of angular rotation of the crankshaft can be expressed by a general equation; angular rotation=RPM×Time. Since RPM can be computed from the most recent twenty degree time period and the amount of angular rotation (five degrees) is known, the factor "Time" can be solved and expressed as a predetermined number of constant frequency clock pulses. This predetermined number of clock pulses are loaded into counter 142 and counted down in a manner that has been described.

By using the most recent twenty degree time period to determine spark advance angle immediately following an interrupt, the system compensates for changes in crankshaft speed that might occur subsequent to the occurrence of a reference position pulse 90. Thus, even if a change in engine speed occurs, the system only uses the most recent twenty degree time period to determine spark advance angle occurring subsequent to an interrupt.

The embodiment of the invention in which an exclusive property of privilege is claimed are defined as follows:

1. A method of controlling the spark timing of an ignition system for a spark ignited internal combustion engine comprising the steps of, developing in response to the rotation of the crankshaft of the engine, a plurality of consecutively occurring reference pulses corresponding to predetermined angular positions of said crankshaft, said plurality of reference pulses being developed during each revolution of said crankshaft, developing in response to rotation of said crankshaft, a plurality of consecutively occurring crankshaft position pulses that occur at predetermined crankshaft positions, the number of position pulses that occur during one revolution of said crankshaft being greater than the number of reference pulses developed during one revolution of said crankshaft whereby a predetermined number of position pulses occur between consecutively occurring reference pulses, the angular spacing between consecutively occurring position pulses being equal and having a predetermined magnitude defining an angular period, developing and storing digital signals that represents consecutively occurring position pulse time periods that occur between consecutively occurring position pulses, computing a desired spark timing value relative to a reference pulse in response to at least one engine operating parameter, determining at the occurrence of a position pulse from said computed spark timing value and from the angular position of the pulse whether a spark should occur during the angular period immediately following the occurrence of the position pulse, repeatedly executing said last named step at the occurrence of each position pulse to identify a position pulse wherein the spark should occur within the angular period immediately following the occurrence of the identified position pulse, and then calculating a spark developing time period at which the spark is to occur after the elapse of said spark developing time period beginning with the occurrence of a position pulse as a function of the magnitude of said position pulse time period that occurred immediately before the occurrence of said identified position pulse.

2. A method according to claim 1 where there are three equally spaced reference pulses and eighteen equally spaced position pulses developed during one revolution of the crankshaft of the engine.

3. A method according to claim 1 where the said computing of said spark timing value is accomplished by computer means in a series of programmed processing steps, and wherein an interrupt is developed at the occurrence of each reference and position pulse that operates to interrupt said processing steps.

4. A method according to claim 1 where certain of said position pulses are developed at the same time that a reference pulse is developed.

5. A method according to claim 1 where the said computing of said spark timing value is accomplished by computer means in a series of programmed processing steps, and wherein an interrupt is developed at the occurrence of each position pulse that operates to interrupt said processing steps, and further wherein at the occurrence of an interrupt said computer means performs the said step of determining from said computed spark timing value and from the angular position of the position pulse whether a spark should occur during the angular period immediately following the occurrence of the position pulse.

* * * * *